United States Patent [19]
Hamblin

[11] Patent Number: 6,039,333
[45] Date of Patent: Mar. 21, 2000

[54] HIKER'S UTILITY TRAIL CART

[76] Inventor: Steven Lee Hamblin, 6349 E. Paeo Otono, Tucson, Ariz. 85750

[21] Appl. No.: 09/021,065

[22] Filed: Feb. 9, 1998

[51] Int. Cl.$^7$ ........................................................ B62B 1/00
[52] U.S. Cl. ...................... 280/47.18; 280/1.5; 280/43.16
[58] Field of Search ........................ 280/1.5, 204, 47.131, 280/47.17, 47.18, 47.21, 47.24, 47.27, 43.16

[56] References Cited

U.S. PATENT DOCUMENTS

| | | | |
|---|---|---|---|
| 3,898,563 | 8/1975 | Erisman | 324/166 |
| 4,045,040 | 8/1977 | Fails | 280/1.5 |
| 4,055,354 | 10/1977 | Sharpe | 280/47.31 |
| 4,236,723 | 12/1980 | Lemmon | 280/1.5 |
| 4,460,189 | 7/1984 | Goff | 280/47.27 |
| 4,645,262 | 2/1987 | Furubotten | 297/129 |
| 4,666,179 | 5/1987 | Adams | 280/655 |
| 4,838,565 | 6/1989 | Douglas et al. | 280/1.5 |
| 5,209,517 | 5/1993 | Shagoury | 280/654 |
| 5,244,217 | 9/1993 | Kotulla | 280/1.5 |
| 5,330,212 | 7/1994 | Gardner | 280/40 |
| 5,385,355 | 1/1995 | Hoffman | 280/1.5 |
| 5,468,009 | 11/1995 | Eyman et al. | 280/650 |
| 5,479,840 | 1/1996 | Hilliard et al. | 83/477.2 |
| 5,524,731 | 6/1996 | Grieg | 188/19 |
| 5,564,720 | 10/1996 | Stringer | 280/30 |

FOREIGN PATENT DOCUMENTS 4202135A  1/1993  Germany.

OTHER PUBLICATIONS

Farrington Chariots, *Stokes Litter Carrier*, web site: http://www.fchariot.com; Sep. 7, 1999.
Roleez Design Systems, *All Terrain Stretcher Carrier*, web Site: http://www.roleez.com; Oct. 4, 1999.

*Primary Examiner*—Kevin Hurley

[57] ABSTRACT

The present invention relates particularly to a two wheeled cart for transporting supplies over a trail and other outdoor terrain. The present invention generally comprises a load support frame having a handlebar and two wheels rotatably secured to the distal portion of the frame. The wheels are either fixed so as to be closely spaced apart in a narrow stance to promote balance yet allow passage through narrow areas, or, the wheels can be made so that they can be interchangeably mounted in a narrow stance or a wider stance to satisfy whatever conditions are present. The frame may be synclinally shaped which when combined with narrowly stanced wheels produces an overall wedge like shape to the cart of the present invention which can more easily pass through or by vegetation. The present invention may further include one, all, or any combination of a bag secured to the frame, a hand controlled brake, a body harness attached to the frame, a raised cross piece (handle/stopper) located at the distal end of the frame, a tow line, and an odometer. The frame of the cart of the present invention may be made of a proximal portion and a distal portion assembled with fasteners to form the frame member. Further, the distal portion may be adapted to be used as a smaller utility cart when the proximal portion is removed.

31 Claims, 6 Drawing Sheets

HIKER'S UTILITY TRAIL CART

BACKGROUND OF THE INVENTION

1. Field of the Invention

The present invention pertains generally to the field of wheeled carts, and particularly to a wheeled cart for carrying gear on a trail or other outdoor terrain.

2. Description of Related Art

Currently, backpacking involves carrying the minimum amount of supplies necessary for survival on one's back to remote areas unaccessible by motorized vehicles. A backpack often weighs 30 or more pounds, thus preventing anyone who cannot carry a backpack from enjoying a wilderness experience. Further, when young children or persons otherwise unable to carry all or any of their own supplies desires to backpack, someone must pack in and out the child/physically challenged person's supplies plus their own, resulting in an extremely large and heavy backpack. The hardship of carrying such a load means that families or groups that include young children or a physically challenged person rarely undertake a backpacking excursion. What is needed is an easier way to carry a heavy load of supplies other than by carrying on the back.

Wheelbarrows and hand trucks provide a way to carry heavy loads without strapping to one's back, but they are not useful for hiking. The wheelbarrow is too difficult to balance and too heavy when loaded and pushed along uneven terrain. The hand truck is hard to steer and too low to the ground bumping into rocks and other elevated spots on the ground, the wheels are too small tending to get stuck in potholes, ruts, muddy and sandy areas, the wheels are also set wide apart making it impossible to travel on narrow footpaths, and, the frame is too bulky tending to snare on passing vegetation. Both the wheelbarrow and hand truck are so troublesome to use on outdoor terrain they are unfit for this type of use.

In answer to the need in the art for a way of carrying supplies over outdoor terrain without strapping the supplies to one's back, the art has devised a variety of wheeled carts. Sharpe, U.S. Pat. No. 4,055,354 (1977), teaches a hikers cart having a pair of baskets/containers for holding gear that straddles a single wheel that is disposed centrally on a long frame having two handlebars. The problem with the hikers cart taught in Sharpe is that the single, centrally disposed wheel results in a cart that has a tendency to tip therefore requiring two operators. The Sharpe hikers cart would be impractical for hikes where two able bodied operators are unavailable or where it is otherwise desirable to have only one operator.

Other references teach an outdoor wheeled cart or carrier that requires a single operator: Lemmon, U.S. Pat. No. 4,236,723 (1980), Douglas et al., U.S. Pat. No. 4,838,565 (1989), Gardner, U.S. Pat. No. 5,330,212 (1994), and Stringer, U.S. Pat. No. 5,564,720 (1996).

Lemmon (1980) teaches a hip cart featuring a frame having two wide stanced wheels on either side of the distal end of the frame, said frame connected to two horizontal arms that are then attached to a hip harness worn by an operator. A load is transported when the operator walks forward thereby pulling the cart behind. Stringer (1996), teaches a portable game cart for carrying game featuring a foldable frame having two wheels on either side of the distal end of the frame, wherein said frame can be folded in half and attached to a backpack harness for carrying when not in use. The Stringer device strongly resembles a hand truck and is unsuitable for trail use for all the reasons associated with the hand truck and discussed above. Gardner (1994) teaches a collapsible wheeled carrier for duck and goose decoys and the like featuring a wheeled nacelle having two handles and two wheels on either side of the central portion of the nacelle. Douglas et al. (1989), teaches a rolling travois featuring a load support frame having a roller comprising a plurality of disks on the distal end of the frame, said frame connected to an arm pivotedly connected to a backpack frame by which the frame is pulled forward by an operator wearing said backpack frame. None of these single operator, two wheeled devices described above are suitable for use on narrow, uneven trails or footpaths because the wheels or roller, as the case may be, are positioned too far apart and simply do not fit on the path. Further, neither of the one or two operator wheeled devices described thus far can be used to move through vegetated terrain because the wide front end of the frame and wheels tend to get stuck when passing by or between closely spaced vegetation.

Another single operator device that teaches carrying supplies other than on the back is taught in Ewer, DE 4202135-A1 (1993). Ewer (1993) teaches a rucksack carrying frame featuring a small wheel(s) that can be folded out to convert the rucksack into a wheeled trolley. The rucksack frame is pivotedly connected to an arm which is pivotedly connected to a waist harness. The Ewer rucksack can be used in two different ways, as an ordinary rucksack carried on the hiker's back when the small wheel(s) are folded in, the arm folded up and the ruck sack frame connected to a shoulder harness, and alternatively, as a wheeled trolley when the wheel(s) are folded outward, the arm disconnected from the shoulder harness thereby releasing the rucksack to the ground where it can then be pulled behind the hiker. While the Ewer device may well fit on narrow footpaths, it still cannot be used by a hiker when moving through thick brush or rocky terrains because the rucksack will likely get stuck after the vegetation falls in behind the hiker's legs. Further, the wheeled trolley pulled by the arm as taught in Ewer appears to be prone to tipping over whenever the wheel(s) at the base of the rucksack encounters rough terrain thereby making the load topple off balance.

The devices taught in the Lemmon and Douglas references also appear to be prone to tipping over as well where the wheels encounter uneven ground toppling the entire load to the ground. In the event that any of the wheeled devices taught in Ewer, Lemmon, or Douglas et al. do tip over, it appears that the operator must then turn about-face and set the device upon its wheel(s) again which probably requires the operator to first remove the harness. What would be better is a wheeled cart that can be pushed thereby placing a single operator in a better position to correct or compensate for tipping.

Finally, none of the references above teach a way of controlling the speed of a wheeled cart when moving down hill, or controlling backsliding when moving up hill. It is to these ends and others that the wheeled cart of the present invention is directed.

SUMMARY OF THE INVENTION

The present invention relates to a two wheeled carrier for manually transporting camping supplies, sports gear, laundry, groceries, and the like. In particular, the present invention is especially useful for transporting camping supplies over outdoor terrain, including a trail, without placing said supplies on one's back.

Generally, the present invention comprises a load support frame having a handlebar at the proximal end (the end nearest the operator) and also having two wheel supporting braces at the opposite, or distal end; and, a pair of wheels rotatably secured to the distal braces of the frame. The wheels may be secured to the distal braces in a narrow stance (fixed wheel position embodiment), or, secured to braces so that the wheels can be interchangeably positioned to the inside or outside of the braces (interchangeable wheel position embodiment) essentially providing a user with more than one wheel stance.

The wheel supporting brace portions of the frame member may be of any construction that positions the wheels at or near the distal end of the frame member. For example, the brace portions may be of a single arm construction (see Example 1, FIG. 1 below) or multiple arm construction (see Example 2, FIG. 2 below), or, may be constructed such that the wheels when mounted thereon extend beyond the distal end of the frame (Example 1), or, the brace portions can be such that the wheels when mounted thereon do not extend beyond the distal end of the frame but extend to the end of the frame member, or, somewhat behind the end of the frame (as in Example 2, FIG. 2). Where the front of the wheels are positioned somewhat behind the distal end of the frame, said wheels may extend behind the distal end any distance that still permits the frame to rest in a substantially upright position on the distal frame end and the wheels, or, up to about 12 inches behind the distal end of the frame as measured along the horizonal plane of the frame from the distal end of the frame to the front of the wheels.

The present invention may further include one or more of the following: a brake for controlling the speed of the wheeled cart of the present invention on sloped terrain; a waist harness attached to the proximal end of the frame for allowing the operator to pull or push the cart when desired, or for supporting the load and freeing up the hands for steering; a bag for holding gear in place on the frame, said bag preferably detachably fastened to the frame; a raised cross piece at the distal end that would allow a second person to lift the distal end of the frame, for example, to assist the operator in transporting the cart and its load over a shallow stream, and, work as a stopper to prevent a load from sliding off the distal end of the frame; a tow line which when tied or otherwise attached to the frame and pulled by a second person (or an animal such as a dog) temporarily assisting the operator, for example, in moving the cart uphill along a switchback trail; a platform portion for supporting a load; and, an odometer.

The frame of the present invention may be made in any suitable generally longitudinal shape, of one or more piece construction, however, two piece construction comprising a proximal portion and a distal portion held together by fasteners so that the frame can be folded roughly in half, or, the proximal portion detached from the distal portion for storage or packaging convenience is preferred. Added utility is provided where the frame is made of a two piece construction where the proximal portion can be removed and where the distal portion is adapted to be used alone as a smaller utility cart. A frame member having two longitudinal frame members with cross pieces therebetween is preferred, although a portion or even all of the area between the longitudinal frame members may be platform like. The frame, or at least a part of the frame, may be synclinally shaped meaning that the longitudinal sides of the frame slope towards one another as they proceed to the distal end so that the width of the distal end is appreciably smaller than the proximal end forming a generally A-shaped frame. The synclinally shaped frame of the present invention is much easier to push through vegetated areas than any of the reference carts above because its streamlined shape allows the cart to wedge its way past vegetation, pushing the vegetation aside instead of getting snagged thereon, etc.

The distally located wheels of the fixed wheel position embodiment of the present invention are mounted to the braces so that the wheels are narrowly stanced in relation to one another meaning the wheels are about 14.0 inches or less apart from one another. It should be evident that the fixed wheel position embodiment having two narrowly stanced wheels is extremely beneficial because a cart with narrowly stanced wheels can easily fit on even the narrowest path, unlike the other dual wheeled carts disclosed above, and, is much easier to balance than the single wheeled cart taught in Sharpe above and thereby requiring but one operator.

Each of the wheels of the interchangeable wheel position embodiment of the cart of the present invention is a wheel having an independent axle, that is, the two wheels do not share a single axle. The distally located wheels of the interchangeable wheel position embodiment of the present invention are connected to the braces with quick release fasteners so as to be interchangeably positioned on the inside of the braces or the outside of the braces, resulting in 3 possible wheel stances. When both wheels are positioned on the inside of the braces, the narrowest stance results, however, this stance is not necessarily limited to the 14.0 inch (maximum) limitation above. When both wheels are positioned on the outside of the braces, the widest stance results. When one wheel is positioned on the inside of one brace and the other wheel is positioned on the outside of the other brace, a mid-ranged stance between the narrowest and widest results. Given that a hiker is likely to encounter several types of terrains conditions on any given excursion, it should be evident that a wheeled cart comprising a load support frame with dual positionable wheels offers the operator the choice of a narrow wheel base or a wide wheel base as conditions and preferences require, an advantage not heretofore taught in the references above. Thus, now a user can chose the narrowest wheel base for rutty or narrow paths, and a wider wheel base for level, paved or broad paths or roads. Never before has such convenience been available.

The brake of the present invention is preferably hand controlled. One or two rim brakes like that taught in the bicycle art, or, a bar brake like that employed on walkers used by the infirm are disclosed, however, any hand operated brake system will suffice. One or two rim brakes are preferred for the fixed wheel position embodiment, and the bar brake is preferred for the interchangeable wheel position embodiment, although either type of brake system can be incorporated on either type of wheel position embodiment. It should be readily apparent that a hand operated wheeled cart with a hand controlled brake system is extremely advantageous when transporting a load on a slope because the speed of the cart can be easily controlled thereby allowing the operator to maintain control of the cart. When moving uphill, a brake system can stop the cart from sliding down and hold it in a given spot thereby granting the operator opportunity to regain footing or take a short break. When moving downhill, the brake system allows the operator to slow the cart down and better control the cart. Never before has such advantages been offered to a hiker.

Accordingly, it is a prime objective of the present invention to provide an improved and novel dual wheeled cart which can be pushed or pulled by a single operator.

A further object of the present invention is to provide a novel wheeled cart having two wheels that can be easily repositioned on said cart so as to change the distance between the wheels thereby providing a cart having more than one possible wheel stance.

Yet another object of the present invention to provide a novel wheeled cart having an synclinal shape that can be pushed more easily through vegetation without getting stuck.

Still another object of the present invention is to provide a unique wheeled cart that allows the operator to control the speed of the cart especially whenever traveling up or down a slope.

Yet another object of the present invention is to provide a wheeled cart with a narrow wheel stance that can fit on a narrow path.

Another object of the present invention is to provide a new wheeled cart that is easy to balance and to maneuver along trails and other outdoor terrain.

A further object of the present invention is to provide a new wheeled cart for transporting supplies over a wide variety of outdoor terrain.

These and still further objects as shall hereinafter appear are fulfilled by the present invention in a remarkably unexpected manner as will be readily discerned from the following detailed description of exemplary embodiments thereof.

BRIEF DESCRIPTION OF THE DRAWINGS

FIG. 1F is a partial view of the embodiment depicted in FIG. 1 having the bag assembly, harness, and tow line removed.

DESCRIPTION OF THE PREFERRED EMBODIMENTS

To further aid in the understanding of the present invention and not by way of limitation, the following examples of the present invention are presented.

EXAMPLE 1

Figure 1:
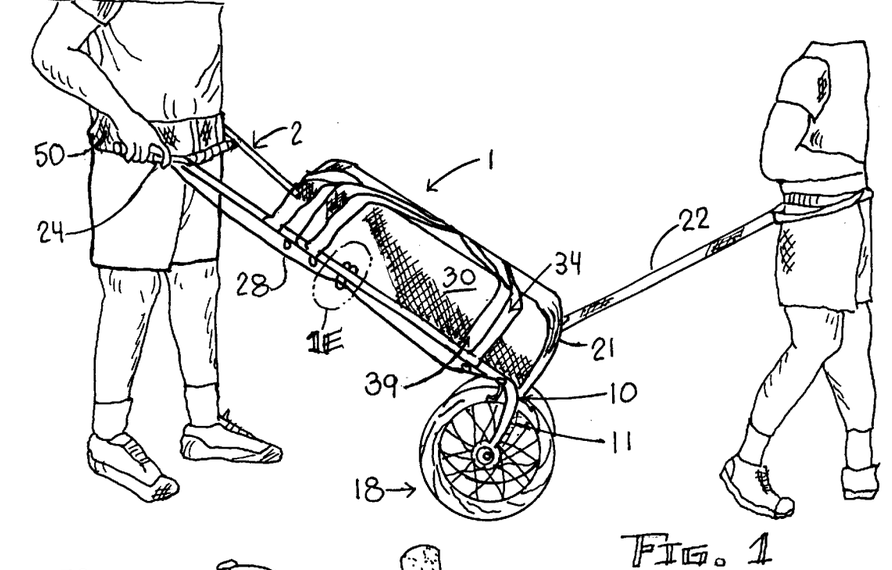
FIG. 1 is a perspective view of a first preferred embodiment of the cart of the present invention featuring the A-shaped frame having forward wheel braces, interchangeable wheels, hand operated rim brake assemblies, bag assembly, raised cross piece, and, tow line.

Referring now to FIGS. 1, and, 1A–1H, a first preferred embodiment of the present invention is shown including a synclinal load support frame 2, and, a first and a second interchangeable wheel assembly 18 and 18', and further including rim brake assemblies 23 and 23', a waist harness 50, a detachable bag 30, a raised cross piece 21, a tow line 22, and an odometer 49 (odometer not depicted in the drawings). Support frame 2 comprises a first distal cross piece 5 about 9.25 inches in length, a second cross piece 6 about 10.75 inches in length, a third cross piece 7 about 12.25 inches in length, and a gently curved, forth proximal cross piece 8 about 14.5 inches from end to end, wherein said cross pieces 5–8 were welded interposedly between a right and a left elongate frame member, 9 and 9', as best shown in FIG. 1F. It should be evident to the relevant artisan that frame parts of the present invention may be held together with fasteners and/or brackets instead of welding.

Frame members 9 and 9' are about 57 inches in length and curved outward to form a handlebar 3, as shown. Cross pieces 5–8 were made from 0.5 inch steel tubing, the ends being slanted so as to better fit between synclining frame members 9 and 9'. Said right and left frame members 9 and 9' are each preferably constructed from 0.75 inch steel tubing and made from two sections that telescope together about midway along the length of said frame member 9 and 9' (indicated by reference numbers 20 and 20') secured together by a first and a second fastener, here a ring bolt and wing nut set, respectively, 16 and 16', as shown in FIGS. 1E and 1F, to make it manually possible to disassemble frame 2 into two pieces for more compact storage where desired. Frame 2 could be made of any rigid material including another metal, a composite, wood, plastic, and the like, or combinations thereof. It should be evident that frame 2 could be of single piece construction, that is, each of frame members 9 and 9' made of a single tubular piece.

Still referring to FIG. 1F, respectively, frame members 9 and 9' each also have a downwardly curved distal portion, 10 and 10', terminating in a wheel support brace portion, 11 and 11', for securing wheels 4 and 4' to frame 2 so that said wheels extend beyond the distal end of frame 2, and, an outwardly curved proximal portion, 12 and 12', which when said portions 12 and 12' are combined with cross piece 8 forms handlebar 3, as shown. Handlebar 3 also features a first and a second hand grip, respectively, 13 and 13', as shown. Respectively, brace portions 11 and 11' each terminate in a flattened axle plate about 0.25 inch thick, respectively, 14 and 14', securely welded thereto as best viewed in FIG. 1D. Each of said axle plate, 14 and 14', define an aperture about 0.5 inch in diameter, 15 and 15' (15' not visible in the drawings), for receiving, respectively, an axle spindle, 40 and 40' (40' not visible in the drawings), said axle spindles described more fully below, of wheel assembly, 18 and 18', as best viewed in FIG. 1D. Axle plates 14 and 14' are in parallel opposition relative to one another and perpendicular to the plane on which wheels 4 and 4' rest so that said wheels 4 and 4' stand vertical and parallel to one another when installed on respective brace portions 11 and 11'.

Wheels 4 and 4' and independent spindles 40 and 40' are important features of the embodiments of the present invention that includes interchangeable wheel positions because they make it possible to position the wheels close together or further apart and are herein described in detail. Wheels 4 and 4' are each a hub and spoke type bicycle wheel having a 16.0 inch tubeless tire like that used on BMX bicycles, although any bicycle type wheel will suffice, preferably about 10.0 inch to about 20.0 inch wheels. Wheels having a rubber donut within the tire instead of an inflatable tube is preferred as they are not subject to deflation due to puncture. Further, other types of wheels could also be used. Wheels 4 and 4' are disposed, respectively, on independent spindles (axle) 40 and 40'. Spindle 40 and 40' are each 0.5 inch in diameter, and together with other connecting parts described below constitute said independent wheel assembly 18 and 18'.

Referring to FIG. 1D, a representative right wheel assembly 18 and right brace portion 11 are shown in a disassembled view. Right wheel assembly 18 includes spindle 40, said spindle 40 having a threaded portion 41 at one end and terminating in a fixed cone portion 42 at the other end. A first washer 43' and a first ball bearing and ball bearing retainer assembly (hence ball bearing assembly) 44' were positioned on spindle 40, then spindle 40 was inserted into the central space of a hub 45 until ball bearing assembly 44' and washer 43' were nestled into a first cup portion 46' (46' not visible in FIG. 1D) of hub 45 and fixed cone portion 42 was flush against washer 43', as shown. A second ball bearing assembly 44" and a second washer 43" were then placed on spindle 40 and nestled in second cup portion 46". A cone 47 was then screwed onto spindle 40 until second ball bearing assembly 44", second washer 43", and cone 47 were positioned against second cup portion 46" and a lock nut 48 was tightened onto spindle 40 and against cone 47, as shown. Spindle 40 as assembled thus far was then inserted through brace aperture 15 of axle plate 14 and a lock washer 19 and wing nut 17 tightened onto spindle 40 and against axle plate 14 thereby securely fastening wheel assembly 18 to frame 2. It should be evident that other quick release fasteners could be used.

As best shown in FIG. 1, fastening wheel assemblies 18 and 18', respectively, to the inside of brace portions 11 and 11', results in the wheels being about 6.5 inches apart measured from the center of each tire. With wheels 4 and 4' secured to the inside of braces 11 and 11', cart 1 can easily fit on a narrow path (an important environmental concern for some wilderness and other natural areas) as well as be balanced more easily than a single wheeled cart, and further, having the wheels mounted to the inside of the braces in combination with the synclinal shape of frame 2 produces an overall wedged shape to the cart as a whole that can easily pass through vegetation overgrown on a path, or alternatively, when moving through uncleared terrain. It should also be evident that wheel assemblies 18 and 18' could be manually removed from the inside of brace portions 11 and 11' and repositioned, respectively, to the outside of brace portions 11 and 11', as best viewed in FIG. 1G, thereby significantly increasing the distance between said wheels to about 13 inches and providing more stability which is preferred whenever traveling on wide trails, or on flat or paved surfaces with little or no vegetation because the further the wheels are apart the less effort the operator needs to exert to balance a load carried thereon.

Figures 1A, 1C:
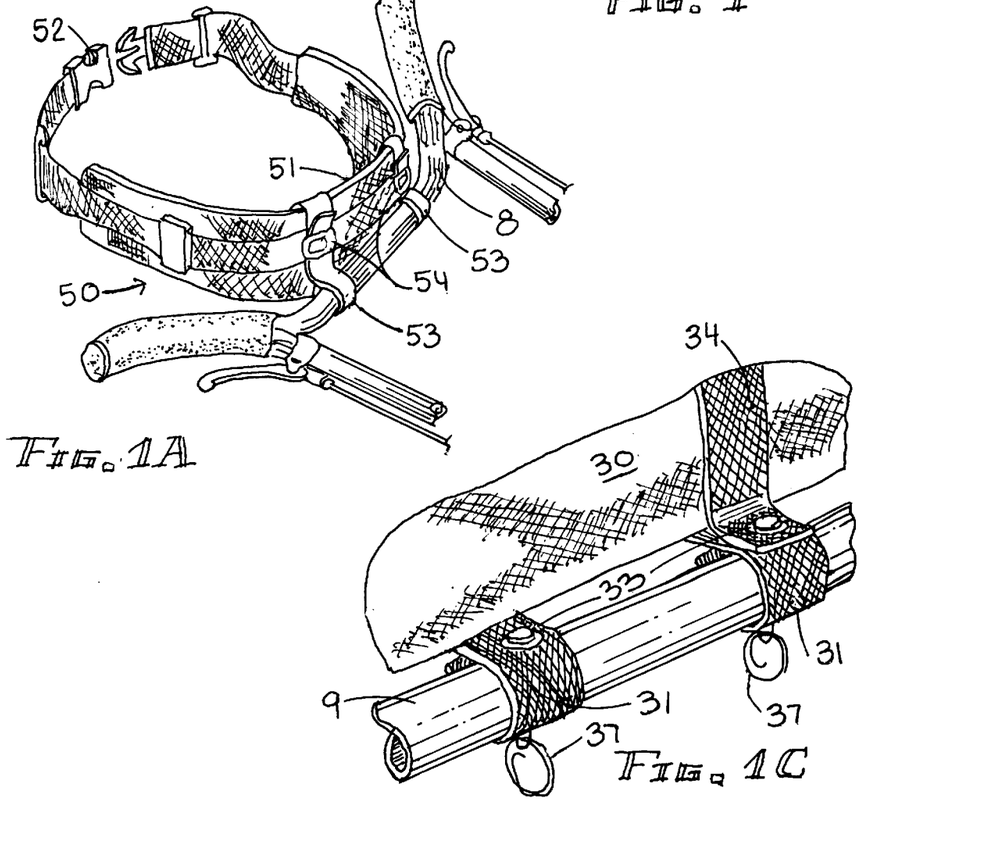
FIG. 1A is a perspective view of the harness of the embodiment featured in FIG. 1.
FIG. 1C is a detailed view of a portion of the embodiment of FIG. 1 showing how the bag is attached to the frame.
Figure 1B:
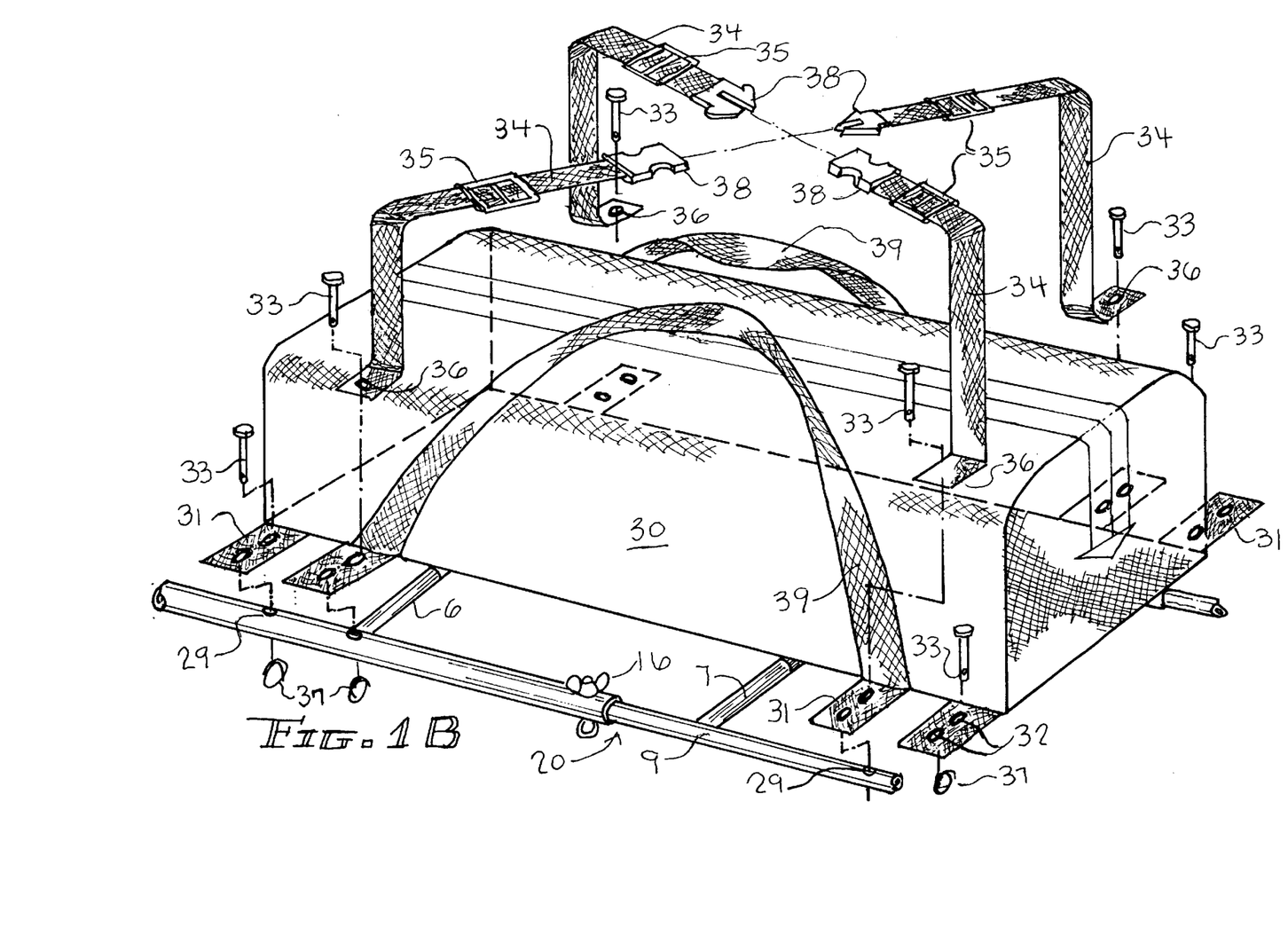
FIG. 1B is an exploded view of the bag assembly of the embodiment shown in FIG. 1.
Figures 1D, 1E, 2D:
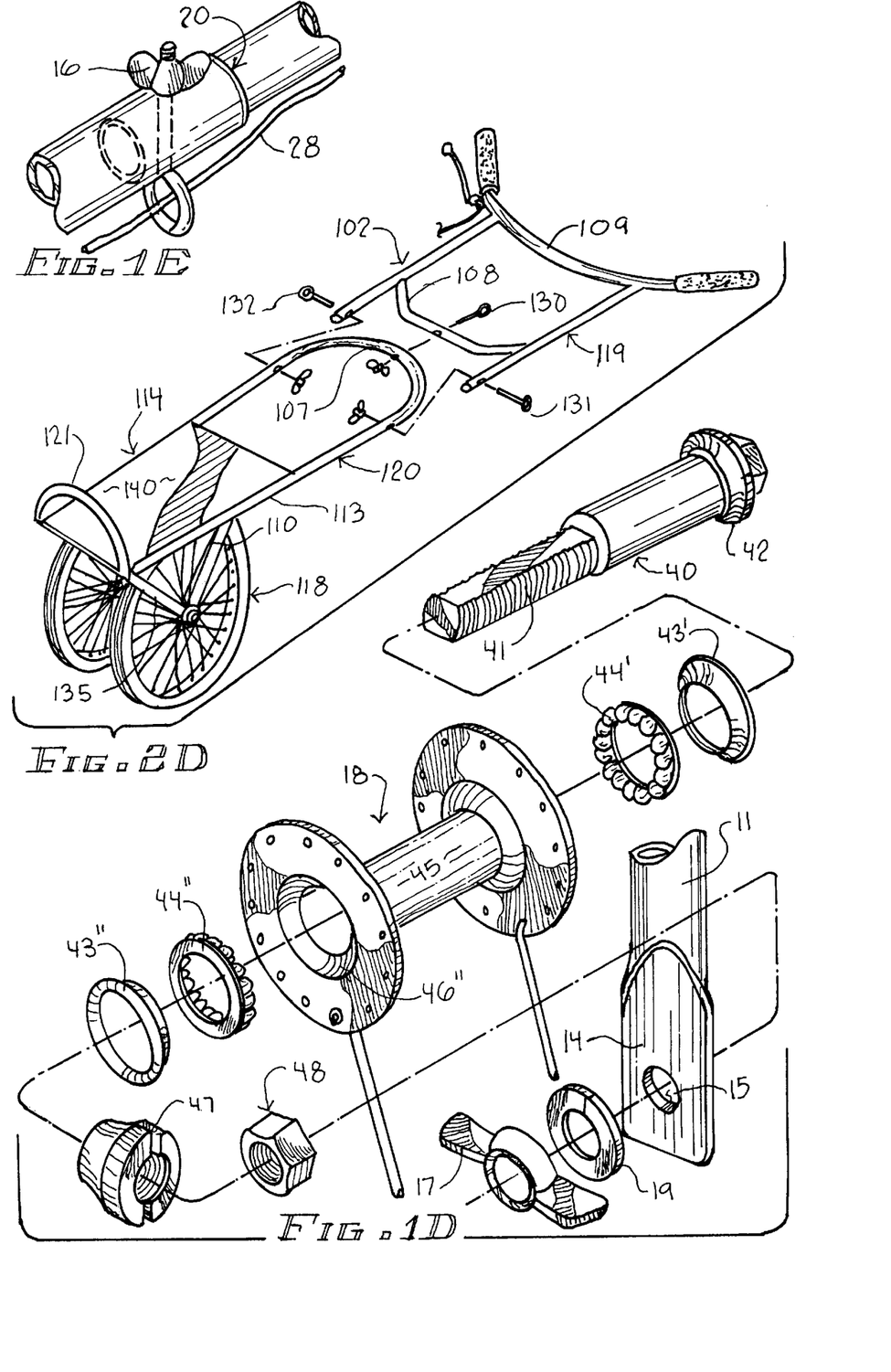
FIG. 1D is an exploded view of the right interchangeable wheel assembly (inside mount) of the embodiment featured in FIG. 1.
FIG. 1E is an enlarged view of the frame of the embodiment depicted in FIG. 1 showing how the proximal portion and distal portion of said frame are joined.
FIG. 2D is a partial view of an improvement of the frame of FIG. 2, said improvement being a platform portion in the stead of the two lower crosspieces.
Figures 1E, 1G, 1H:
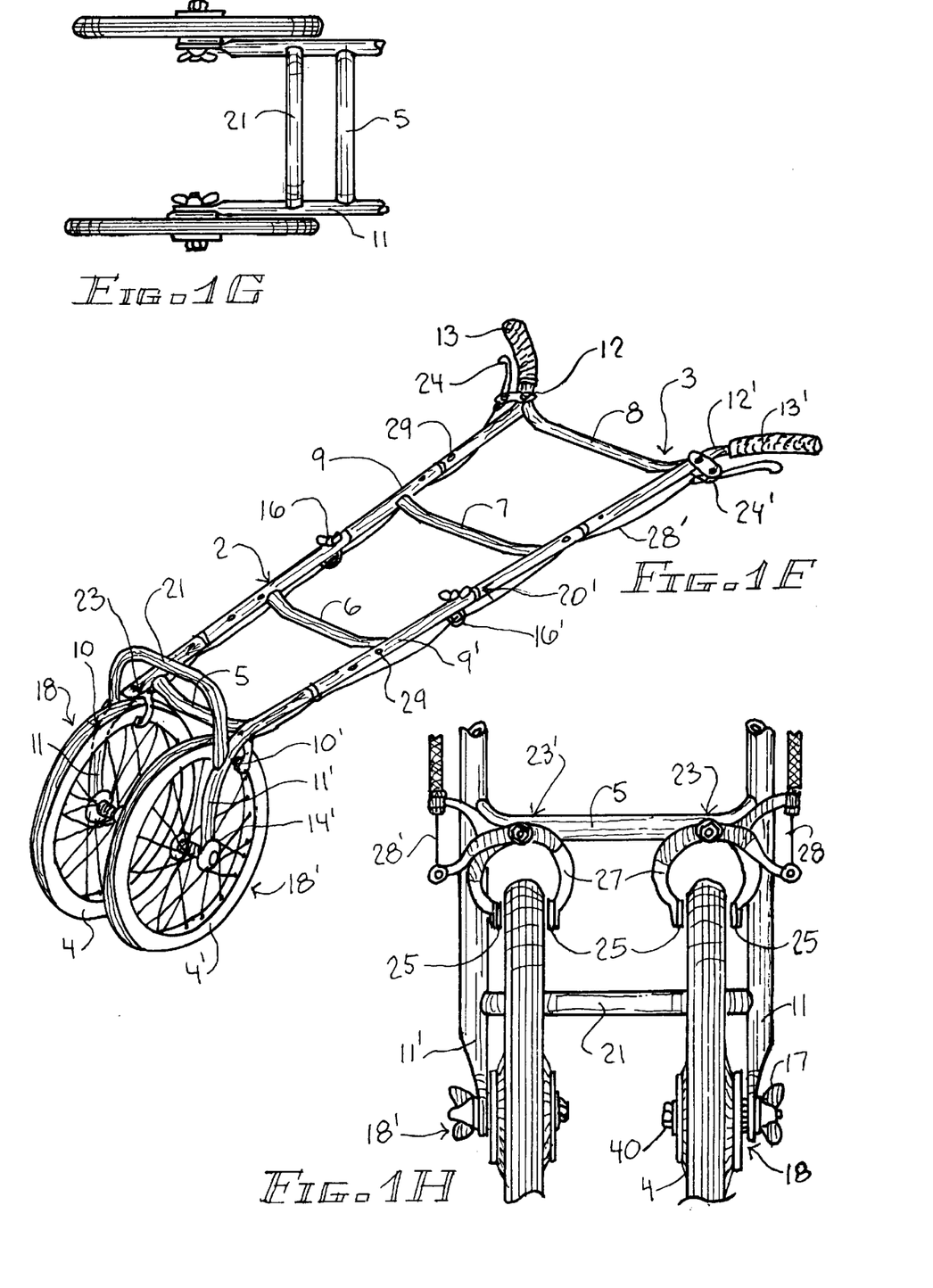
FIG. 1G is a partial view of the embodiment depicted in FIG. 1 featuring the wheels rotatably secured on the outside of the wheel braces. Note that the brakes are not depicted in this figure.
FIG. 1H is a partial view of the embodiment depicted in FIG. 1 featuring the wheels and rim brake assemblies.

Frame 2 further includes a raised cross piece 21 (best viewed in FIG. 1F) and a right and left rim brake assembly, 23 and 23' (best viewed in FIG. 1H). Raised cross piece 21 is useful for providing a second, temporarily assisting operator a place to manually grip and then lift the distal end of the cart of the present invention for carrying a loaded cart over a stream or muddy area, for example, and further, raised cross piece 21 is useful for providing a stopper that could help prevent a loosely strapped load from shifting over the distal end of frame 2 while traveling. Raised cross piece 21 was made from 0.5 inch steel tubing bent into an arch shape then welded to the longitudinal frame members 9 and 9', as shown.

Right and left hand operated brake assemblies 23 and 23' were rim brakes of the type commonly used on bicycles and include respectively, right and left brake calipers 27, brake pads 25, brake cables 28 and 28', and hand levers 24 and 24'. Brake assemblies 23 and 23' were mounted to cross piece 5, brake cables 28 and 28' and hand levers 24 and 24' were secured to respective longitudinal frame members 9 and 9' so as to make hand levers 24 and 24' accessible to the operator hands when holding onto handlebar 3, and, brake pads 25 and 25' were positioned astride the respective rims of wheels 4 and 4' while said wheels are positioned on the inside of respective brace portions 11 and 11', as best viewed in FIG. 1H.

Although this first example preferably includes two hand-brake assemblies 23 and 23', it should be evident that a single rim brake assembly would also suffice. It should also be apparent that wheel assemblies 18 and 18' may still be repositioned to the outside of respective brace portion 11 and 11' as well as the inside as best viewed in FIG. 1G, and that when wheel assemblies 18 and 18' are repositioned to the outside of respective brace portions 11 and 11', brake assemblies 23 and 23' as herein described do not engage with wheels 4 and 4'.

As best shown in FIGS. 1B, 1C, and 1F, frame members 9 and 9' each further include a plurality of apertures 29 which are used to secure bag 30 to frame 2. Bag 30 is preferably made of nylon canvas with a zipper opening and has bag handles 39 attached thereto for carrying bag 30 whenever bag 30 is detached from frame 2, and, a plurality of tabs 31 each having an eyelet pair 32 for securing bag 30 to frame 2 with pins 33 and rings 37, as best shown in FIGS. 1B and 1C. Tabs 31 were each made of a length of flat nylon webbing, double folded and securely sewn into the relevant bottom seam of bag 30 and a pair of metal eyelets installed on each of said folded nylon webbing thereby forming tabs 31. Bag 30 is also secured to frame 2 with straps 34, each of said straps 34 having adjustable clasps 35 for adjusting the length of straps 34, a buckle 38, and an eyelet 36 at each end of straps 34, as best shown in FIG. 1B. Straps 34 were secured to longitudinal frame members 9 and 9' with pins 33 and rings 37. Tabs 31 preferably share the same aperture 29 with straps 34, as best shown in FIG. 1C.

Referring to FIGS. 1 and 1A, harness 50 includes a belt 51 with a waist buckle 52, and at least two straps 53 with strap buckles 54 sewn to belt 51, as shown. Belt 51 is similar to a belt worn when lifting a heavy weight. Straps 53 and strap buckles 54 are for removably securing harness 50 to cross piece 8, as shown thereby providing a way to transfer some of the load weight from the upper body to the lower body of an operator wearing said belt, and further, to further aid in steadying the load carried on frame 2 particularly when traveling on bumpy trails and the like. It should be evident that harness 50 could be permanently secured to cross piece 8 but is preferably removably secured as the use of the harness 50 is not always desirable or safe, especially when traveling on switchback trails or other dangerous terrain where a wheeled cart could fall down a canyon wall.

Odometer 49 (not depicted) was joined to said frame and wheels in a manner similar to that taught in the bicycling arts. Tow line 22 was made from a length of adjustable nylon strap of about 6.0 feet having a loop at one end for the operator's hand, shoulder or waist to hold onto, and a means for securing to frame 2 at the opposite end. Tow line 22 allows a second, optional, operator to assist the primary operator where terrain is especially difficult to travel, such as slopes, sandy or muddy areas.

EXAMPLE 2

Referring now to FIGS. 2, 2A, 2B, and 2C, a cart 100 of a second preferred embodiment of the present invention is shown comprising a foldable load support frame 102 and a first and a second interchangeable wheel assembly 118 and 118' secured to the distal end of frame 102, and further including a hand operated rod brake assembly 123, a waist harness 133, and a raised cross piece 121.

Figures 2, 3B:
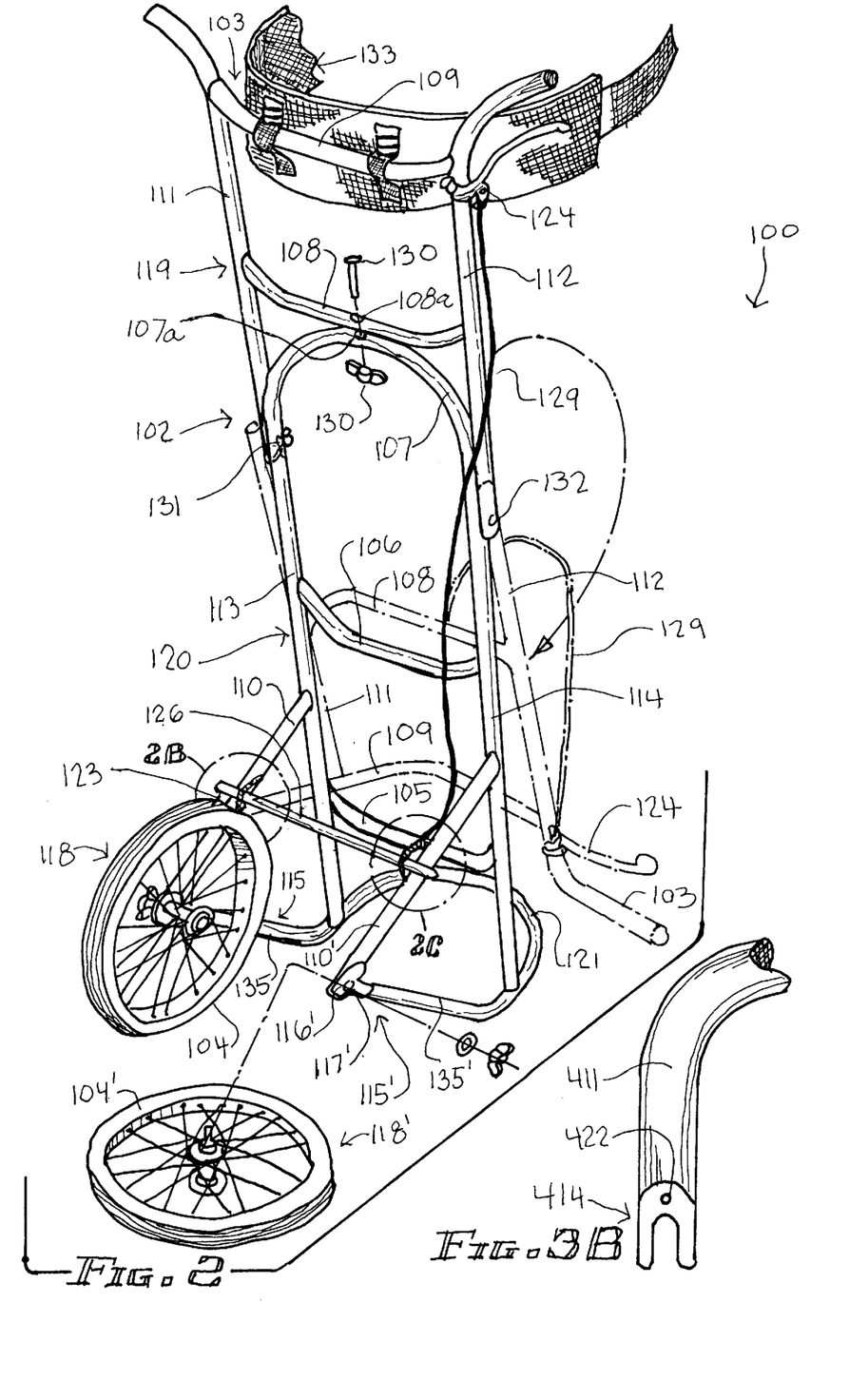
FIG. 2 is a perspective view of a second preferred embodiment of the cart of the present invention featuring the load support frame, two interchangeable wheel assemblies, bar brake assembly, raised cross piece, and harness.
FIG. 3B depicts the preferred axle plate featuring a drop out for an embodiment similar to FIG. 1 that includes a dual fixed wheel assembly.

Referring to FIG. 2, support frame 102 includes a handlebar 103 at its proximal end and a left and a right wheel supporting brace portion, 115 and 115', at its distal end, and was made from steel tubing shaped and welded to form two parts, a proximal portion 119 and a distal portion 120. Proximal portion 119 was made of a first cross piece 109, a second, shorter, cross piece 108 having a central aperture 108a, and, a proximal left and a proximal right longitudinal member 111 and 112, wherein said first and said second cross piece 109 and 108 were welded in between longitudinal members 111 and 112 forming synclinal proximal portion 119 with handlebar 103 as shown. The lower end of each longitudinal member 111 and 112 was flattened and includes an aperture, respectively, 111a and 112a (apertures not visible in FIG. 2).

Figures 2A, 2B, 2C, 3A:
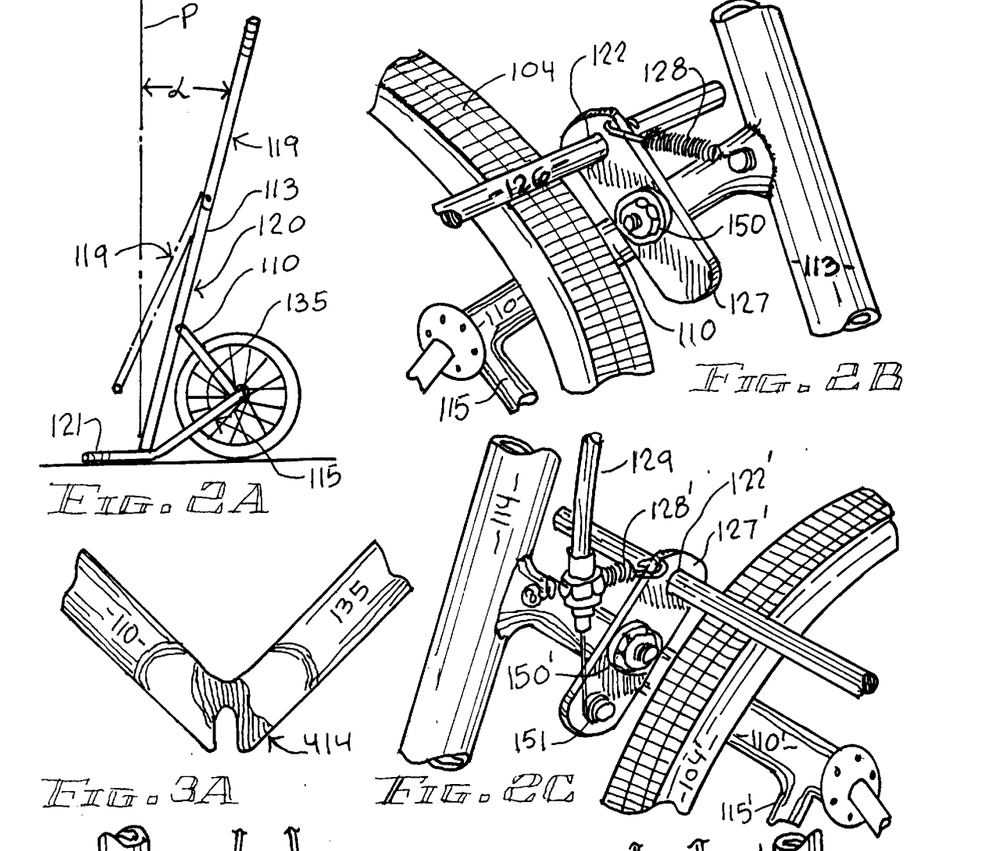
FIG. 2A is a reduced side view of the embodiment of FIG. 2 in a standing/resting position.
FIG. 2B is a detailed partial view of the bar brake assembly of the embodiment of FIG. 2 featuring the left brake lever.
FIG. 2C is a detailed partial view of the bar brake assembly of the embodiment of FIG. 2 featuring the right brake lever.
FIG. 3A depicts the preferred axle plate featuring a drop out for an embodiment similar to FIG. 2 that includes a dual fixed wheel assembly.

Distal portion 120 of frame 102 was made from a length of steel tubing bent into a first U shape and welding cross pieces 105 and 106 made of equal lengths of steel tubing between the legs of said first U, the legs of said first U forming longitudinal members 113 and 114 of frame 102 and the crook of said first U forming cross piece 107, as shown. Apertures 113a and 114a were placed in the upper portion of frame members 113 and 114 and an aperture 107a was placed in frame member 107 (113a and 114a are not visible in FIG. 2). Distal portion 120 of frame 102 also includes left and right brace portion 115 and 115' (rearward braces) and raised cross piece 121. Raised cross piece 121 and brace portions 115 and 115' were made of a second length of steel tubing first bent into a second U shape then bending the legs of said second U away from the plane of the crook of said second U forming raised cross piece 121 and brace bars 135 and 135'. A left and a right axle plate 116 and 116' with apertures 117 and 117' (116 and 117 not visible in the drawings), similar to the axle plate 14 of Example 1 above, was then welded to the end of said brace bars 135 and 135'. Said raised cross piece/brace bars 121/135 & 135' were then welded to the ends of longitudinal members 113 and 114, as shown. Distal portion 120 of frame 102 was completed by welding one end of each of two brace bars, 110 and 110', to respective longitudinal members 113 and 114, and the other end of each of said bars 110 and 110', respectively, to said left and said right axle plate, 116 and 116', as shown, thereby completing said left and said right wheel supporting braces, 115 and 115'. Raised cross piece 121/brace portions 115 and 115' are such that when wheel assemblies 118 and 118' are attached thereto, wheels 104 and 104' do not appreciably extend beyond the distal end of frame 102 (rearward braces) and so that cart 100 can stand substantially upright in a resting position on wheels 104 and 140' and arch 121, and further, the angle α between the plane of raised cross piece 121 and a line p that is perpendicular to the ground/plane of arch 121 is about 10° (making the angle between 121 and 113 preferably about 100°) so that cart 100 is less likely to tip over when placed in the upright position with a load secured thereto, as best shown in FIG. 2A.

The proximal portion 119 of frame 102 is joined to the distal portion 120 of frame 102 by aligning longitudinal members 111 and 112, cross piece 108, and apertures 111a, 112a, and 108a with longitudinal members 113 and 114, cross piece 107, and apertures 113a, 114a, and 107a, and securing with a temporary connecting means comprising fasteners 130, 131, and 132, as shown. It should be evident that whenever fastener 130 is removed that proximal portion 119 may be folded over to meet distal portion 120 by hinging on fasteners 131 and 132 thereby making frame 102 easier to transport and take up less storage space. It should be further evident that when the distal portion of frame 102 is removed from said proximal portion by loosening or removing fasteners 131 and 132, that said distal portion is useful in and of itself as a smaller utility cart for carrying sports equipment or other short term uses (with or without a bag attached to the frame) other than carrying gear on a trail. In the instant embodiment, fasteners 131–132 are each pin and linchpin sets and 130 is a ring bolt and wingnut set, but it should be evident that other fasteners are suitable and that fastener 130 is preferably a quick release fastener so that proximal portion 119 can be readily folded or extended.

Wheel assemblies 118 and 118' are constructed and attached, respectively, to brace portions 115 and 115' in a like manner as that described for Example 1 above and no further description should be needed here. Waist harness 133 likewise is made and attached to frame 102 in a like manner as that described in Example 1 above. Referring now to FIGS. 2, 2B, and 2C, rod brake assembly 123 of the instant embodiment is shown, said rod brake assembly being similar to the brake assembly used on walkers for the disabled. Rod brake assembly 123 includes a brake rod 126; a left and right lever 127 and 127' having, respectively, a first and a second brake rod receiving aperture, 122 and 122'; a left and a right spring 128 and 128'; and a hand controlled brake cable 129 with hand control 124, wherein said cable 129 and control 124 were of the type conventionally used for bicycle hand controlled rim brakes. Hand control/cable 124/129 was secured to the right handle of handlebar 103 and the opposite end of cable 129 was welded or otherwise secured to brace bar 110', as shown. Right lever 127' was also secured to brace bar 110' with a bolt, washer and nut 150', and cable 129 secured to right lever 127' at a position indicated by 151 as best shown in FIG. 2C. Right spring 128' was attached to right lever 127' by hooking the end of lever 127' through a small aperture in lever 127', and, spring 128' was welded or otherwise secured to the end of cable 129, as shown. Left lever 127 was secured to brace bar 110, and, left spring 128 was attached to brace bar 110 with a bolt, washer and nut 150 and left lever 127 in a manner similar to that just described for right lever 127' above, as best shown in FIG. 2B. Brake rod 126 was positioned through right lever aperture 122' and left lever aperture 122 and spot welded or otherwise secured where rod 126 and aperture 122/122' meet so that brake rod 126 remains in place and does not rotate when the brakes are applied against wheels 104 and 104' during operation. It should be evident that levers 127 and 127' are positioned such that springs 128 and 128' hold brake rod 126 clear of wheels 104 and 104' when hand controlled brake cable is at rest. In operation, pressing brake hand control 124 causes cable 129 to lift right lever 127' thereby forcing brake bar 126 against wheels 104 and 104'. It should also be apparent that unlike the rim brake assembly of Example 1 above, rod brake assembly 123 of the instant Example will engage wheels 104 and 104' when wheels 104 and 104' are mounted to the inside or the outside of brace portions 115 and 115'.

Referring to FIG. 2D, frame 102 of Example 2 is shown modified said modification involving including a platform portion 140 attached to the lower parts of longitudinal members 113 and 114 of the distal frame portion 120 instead of cross bars 105 and 106. Platform portion 140 can be made of any sturdy material including metal, plastic, wood, fiberglass, composites, etc. Platform portion 140 is useful in that it prevents some loads or bags carried on frame 102 from sagging down and rubbing against or otherwise interfering with the operation of the wheels and/or brake and can protect against water/mud flipping onto the bag.

It should be evident that other preferred embodiments (not depicted) can be drawn from the above description of Example 1 or Example 2, some of these other embodiments comprising as few elements as a frame and dual interchangeable wheel assemblies, or, comprising the frame and dual interchangeable wheel assemblies and one or a combination of more than one of a raised cross piece, brake system, bag, waist harness, tow line, odometer, or platform portion. For example, other embodiments include: the embodiment of Example 1 having a platform portion instead of cross bars, a bar brake instead of rim brake(s), rearward wheel brace portions that position the wheels behind the distal end of the frame instead of beyond the distal end of the frame, or a combination thereof. Likewise, the embodiment described in Example 2 above may feature rim brake(s) instead of a bar brake, forward wheel brace portions that position the wheels beyond the distal end of the frame instead of behind the distal end of the frame, or a combination thereof.

Still other preferred embodiments of the present invention comprise any of the embodiments disclosed above having a dual wheel assembly having fixed, narrowly stanced wheels (about 14.0 inches or less) instead of dual interchangeable wheel assemblies. It is preferable that the brace portion of an embodiment featuring dual fixed, narrow stanced wheels have a drop out on the axle plates instead of an aperture, as shown in FIGS. 3A and 3B and further discussed below. Unlike the interchangeable wheel assembly, the wheels of a fixed wheel assembly remain in one position and cannot easily be repositioned on the load support frame.

Figure 3:
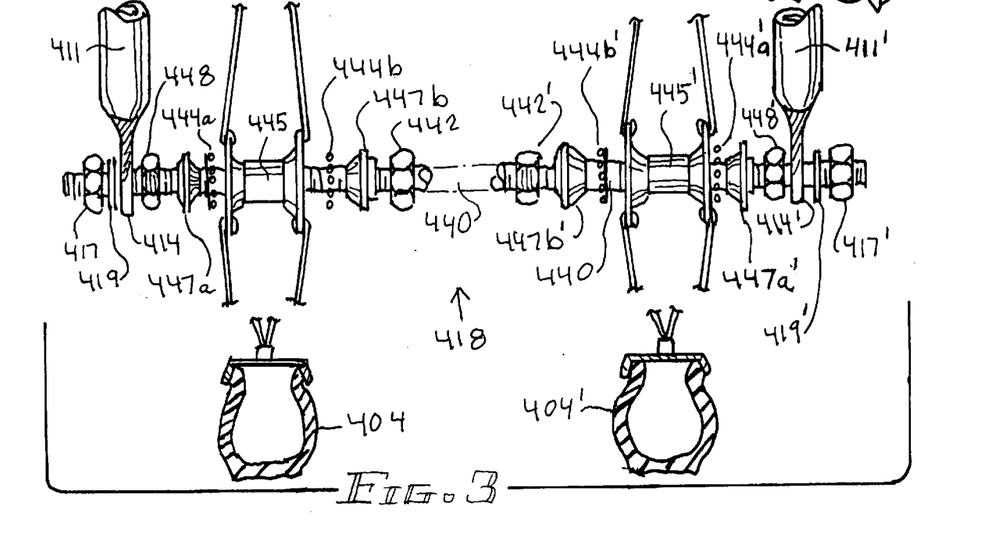
FIG. 3 is a partially assembled view of a representative fixed, narrow stanced wheel assembly that may be substituted in the stead of the interchangeable wheel assemblies of the embodiments of FIG. 1 or 2.

Referring now to FIG. 3, a representative fixed wheel assembly 418 is shown in detail mounted to single arm wheel brace portions 411 and 411' of a frame 402 (not depicted), wherein said frame 402 and left and right wheel brace portions 411 and 411' are constructed similar to that disclosed in Example 1 except that wheel brace portions 411 and 411' terminate, respectively, in a left and a right drop out, 414 and 414' with a bike washer safety hole, 422 and 422' (414' and 422' not depicted in the drawings), instead of an aperture (drop out best described in FIG. 3B). Fixed wheel assembly 418 comprises a first and a second wheel 404 and 404' disposed on an axle 440. Axle 440 of a fully assembled wheel assembly 418 is mounted to wheel brace portions 411 and 411' by inserting the ends of axle 440 into drop outs 414 and 414' and securing to frame 402.

Axle 440 is threaded along its length and wheels 404 and 404' disposed thereon so that wheels 404 and 404' are spaced equally distance from the center of axle 440. Left wheel 404 is installed onto axle 440 by positioning, in order, a first lock nut 442, a first cone 447b, and a first ball bearing and ball bearing retainer (hence ball bearing assembly) 444b, then inserting axle 440 through left hub 445, followed by a second ball bearing assembly 444a, a second cone 447a, taking care to securely nestle ball bearing assemblies 444a and 444b, and cones 447a and 447b into the cup portions of hub 445 followed by lock nut 448 (cup portions not visible in the drawings). Lock nuts 442 and 448 are tightened, respectively, against cones 447b and 447a to further retain wheel 404 in position on axle 440. Right wheel 404' is similarly situated on axle 440. With wheels 404 and 404' installed onto axle 440, the left and right ends of axle 440 are slipped, respectively, into the slots of left and right drop-outs 414 and 414' and secured, respectively, with a left and a right lock washer 419 and 419' and a left and a right external lock nut 417 and 417', as shown. As an alternative, quick release fasteners could be used instead of lock nut 417 and 417'.

It should be evident where a fixed wheel assembly is combined with a frame having two legged brace portions like that described in FIG. 2, said brace portions each would include a drop out instead of an axle plate aperture. FIG. 3A shows a left drop out 414 on brace portion legs 110 and 135.

From the foregoing, it is readily apparent that a useful embodiment of the present invention has been herein described and illustrated which fulfills all of the aforestated objectives in a remarkably unexpected fashion. It is of course understood that such modifications, alterations, substitutions and adaptations as may readily occur to the artisan confronted with this disclosure are intended within the spirit of this disclosure.

What is claimed is:

1. A wheeled cart comprising:
    a load support frame having a proximal end and a distal end, wherein said proximal end includes a handlebar, wherein said distal end of said frame is narrower than said proximal end, said frame assuming a generally A-shape, and wherein said distal end includes a first and a second wheel supporting brace; and,
    a first and a second wheel rotatably secured, respectively, to said first and said second brace in such a way that the distance between said wheels is about 14.0 inches maximum.

2. The cart according to claim 1, further including a bag, said bag attached to said frame.

3. The cart according to claim 1, wherein said frame further includes a proximal portion and a distal portion, wherein said proximal portion and said distal portion are connected by a temporary connecting means so that said frame can be folded or disassembled.

4. The cart according to claim 1, wherein said frame further includes a proximal portion and a distal portion, wherein said proximal portion and said distal portion are connected by a temporary connecting means in such a way that said proximal portion can be removed from said distal portion and said distal portion used as a smaller utility cart.

5. The cart according to claim 1, further including a raised cross piece attached to and contiguous with said distal end of said frame.

6. The cart according to claim 5, further including a tow line, said tow line attached to said raised cross piece.

7. The cart according to claim 1, further including a waist harness, said harness attached to said proximal end of said frame.

8. The cart according to claim 1, further including a brake assembly, said brake assembly operationally connected to said wheels.

9. The cart according to claim 8, further including a raised cross piece attached to and contiguous with said distal end of said frame.

10. The cart according to claim 8, further including a bag, said bag attached to said frame.

11. The cart according to claim 8, further including a waist harness, said harness attached to said proximal end of said frame.

12. The cart according to claim 11, further including a bag, said bag attached to said frame; and, a raised cross piece attached to and contiguous with said distal end of said frame.

13. The cart according to claim 8, wherein said frame further includes a proximal portion and a distal portion, wherein said proximal portion and said distal portion are connected by a temporary connecting means so that said frame can be folded or disassembled.

14. A wheeled cart comprising:
a load support frame having a proximal end and a distal end, wherein said proximal end includes a handlebar, wherein said distal end of said frame is narrower than said proximal end, said frame assuming a generally A-shape, and wherein said distal end includes a first and a second wheel supporting brace; and,
a first and a second wheel having an independent axle, said wheels rotatably secured, respectively, to said first and said second brace with a first and a second quick release fastener for interchangeably positioning each of said wheels on the inside or outside of said relevant brace.

15. The cart according to claim 14, further including a bag, said bag attached to said frame.

16. The cart according to claim 14, wherein said frame further includes a proximal portion and a distal portion, wherein said proximal portion and said distal portion are connected by a temporary connecting means so that said frame can be folded or disassembled.

17. The cart according to claim 14, wherein said frame further includes a proximal portion and a distal portion, wherein said proximal portion and said distal portion are connected by a temporary connecting means in such a way that said proximal portion can be removed from said distal portion and said distal portion used as a smaller utility cart.

18. The cart according to claim 14, further including a raised cross piece attached to and contiguous with said distal end of said frame.

19. The cart according to claim 14, further including a tow line, said tow line attached to said raised cross piece.

20. The cart according to claim 14, further including a waist harness, said harness attached to said proximal end of said frame.

21. The cart according to claim 14, further including a brake assembly, said brake assembly operationally connected to said wheels.

22. The cart according to claim 21, further including a raised cross piece attached to and contiguous with said distal end of said frame.

23. The cart according to claim 21, further including a bag, said bag attached to said frame.

24. The cart according to claim 21, further including a waist harness, said harness attached to said proximal end of said frame.

25. The cart according to claim 24, further including a bag, said bag attached to said frame; and, a raised cross piece attached to and contiguous with said distal end of said frame.

26. The cart according to claim 21, wherein said frame further includes a proximal portion and a distal portion, wherein said proximal portion and said distal portion are connected by a temporary connecting means so that said frame can be folded or disassembled.

27. A wheeled cart comprising:
a load support frame having a proximal end and a distal end, wherein said proximal end includes a handlebar wherein said distal end of said frame is narrower than said proximal end, said frame assuming a generally A-shape, and said distal end includes a first and a second wheel supporting brace; wherein said frame further includes a proximal portion and a distal portion, said proximal portion and said distal portion joined together by a temporary connecting means so that said frame can be folded or disassembled;
a first and a second wheel having an independent axle, said wheels rotatably secured, respectively, to said first and said second brace with a first and a second quick release fastener for interchangeably positioning each of said wheels on the inside or outside of said relevant brace;
a brake assembly, said brake assembly operationally connected to said wheels;
a raised cross piece attached to and contiguous with said distal end of said frame; and,
a bag, said bag attached to said frame.

28. The cart according to claim 27, wherein said first and said second brace are positioned on said frame such that the front of said first and said second wheels when positioned, respectively, on said first and said second brace, are behind the distal end of said frame any distance that still permits said frame to rest in a substantially upright position on the distal end of said frame, the front of said first wheel, and the front of said second wheel; and, wherein said distal portion of said frame further includes a load supporting surface.

29. The cart according to claim 28, further including a tow line, said tow line attached to said raised cross piece; and a waist harness, said harness attached to said proximal end of said frame.

30. The cart according to claim 27, wherein said first and said second brace are positioned at said distal end of said frame such that the front of said wheels extend beyond the distal end of said frame.

31. The cart according to claim 30, further including a tow line, said tow line attached to said raised cross piece; and a waist harness, said harness attached to said proximal end of said frame.

* * * * *